United States Patent
Perozzi et al.

(10) Patent No.: US 10,810,493 B1
(45) Date of Patent: Oct. 20, 2020

(54) TRAINING AND/OR UTILIZING RECURRENT NEURAL NETWORK MODEL TO DETERMINE SUBSEQUENT SOURCE(S) FOR ELECTRONIC RESOURCE INTERACTION

(71) Applicant: Google Inc., Mountain View, CA (US)

(72) Inventors: Bryan Perozzi, Cranford, NJ (US); Yingtao Tian, Stony Brook, NY (US)

(73) Assignee: GOOGLE LLC, Mountain View, CA (US)

( * ) Notice: Subject to any disclaimer, the term of this patent is extended or adjusted under 35 U.S.C. 154(b) by 768 days.

(21) Appl. No.: 15/466,056

(22) Filed: Mar. 22, 2017

(51) Int. Cl.
 *G06N 3/08* (2006.01)
 *G06N 7/00* (2006.01)
 *G06N 3/04* (2006.01)

(52) U.S. Cl.
 CPC ............. *G06N 3/08* (2013.01); *G06N 3/0445* (2013.01); *G06N 7/005* (2013.01)

(58) Field of Classification Search
 None
 See application file for complete search history.

(56) References Cited

U.S. PATENT DOCUMENTS

| 2012/0101966 | A1* | 4/2012 | van Coppenolle | G06Q 30/06 706/20 |
|---|---|---|---|---|
| 2015/0350149 | A1 | 12/2015 | Acharya et al. | |
| 2016/0353144 | A1 | 12/2016 | Gopalan | |

FOREIGN PATENT DOCUMENTS

WO  2016165058  10/2016

OTHER PUBLICATIONS

Du et al., Recurrent Marked Temporal Point Processes: Embedding Event History to Vector, KDD' 16, Aug. 13-17, 2016, pp. 1555-1564 (Year: 2016).*
Zhang et al., Retweet Prediction with Attention-based Deep Neural Network, CIKM'16 , Oct. 24-28, 2016, pp. 75-84 (Year: 2016).*
Li et al., Evaluating Disseminators for Time-critical Information Diffusion on Social Networks, Proceedings of the International Conference on Data Communication Networking, e-Business and Optical Communication Systems, 2012, pp. 251-260 (Year: 2012).*

(Continued)

*Primary Examiner* — Alan Chen
(74) *Attorney, Agent, or Firm* — Middleton Reutlinger

(57) ABSTRACT

Systems, methods, and computer readable media related to training and/or utilizing a neural network model to determine, based on a sequence of sources that each have an electronic interaction with a given electronic resource, one or more subsequent source(s) for interaction with the given electronic resource. For example, source representations of those sources can be sequentially applied (in an order that conforms to the sequence) as input to a trained recurrent neural network model, and output generated over the trained recurrent neural network model based on the applied input. The generated output can indicate, for each of a plurality of additional sources, a probability that the additional source will subsequently (e.g., next) interact with the given electronic resource. Such probabilities indicated by the output can be utilized in performance of further electronic action(s) related to the given electronic resource.

12 Claims, 9 Drawing Sheets

(56) References Cited

OTHER PUBLICATIONS

Hochreiter et al. "Long Short-Term Memory" Neural computation 9, No. 8 (1997): pp. 1735-1780 1997.
Goldenberg et al. "Talk of the Network: A Complex Systems Look at the Underlying Process of Word-of-Mouth." Marketing letters 12, No. 3 (2001): pp. 211-223 2001.
Leskovec et al. "Meme-Tracking and the Dynamics of the News Cycle." In Proceedings of the 15th ACM SIGKDD International Conference on Knowledge Discovery and Data Mining, pp. 497-506. ACM, 2009 2009.
Opsahl et al. "Clustering in Weighted Networks." Social Networks 31, No. 2 (2009): pp. 155-163 2009.
Mikolov et al. "Distributed Representations of Words and Phrases and Their Compositionality." In Advances in Neural Information Processing Systems, pp. 3111-3119. 2013 2013.
Kingma et al. "Adam: A Method for Stochastic Optimization." In: arXiv preprint arXiv:1412.6980 (2014) 9 pages 2014.
Perozzi et al. "Deepwalk: Online Learning of Social Representations." In Proceedings of the 20th ACM SIGKDD International Conference on Knowledge Discovery and Data Mining, pp. 701-710. ACM, 2014 2014.
Sutskever et al. "Sequence to Sequence Learning with Neural Networks." In Advances in Neural Information Processing Systems, pp. 3104-3112. 2014 2014.
Bourigault et al. "Representation Learning for Information Diffusion Through Social Networks: An Embedded Cascade Model." In Proceedings of the Ninth ACM International Conference on Web Search and Data Mining, pp. 573-582. ACM, 2016 2016.
Grover et al. "Node2Vec: Scalable Feature Learning for Networks." In Proceedings of the 22nd ACM SIGKDD International Conference on Knowledge Discovery and Data Mining, pp. 855-864. ACM, 2016 2016.
Li et al. "DeepCas: An End-to-End Predictor of Information Cascades." arXiv preprint arXiv:1611.05373 (2016) 10 pages 2016.
Pereyra et al. "Regularizing Neural Networks by Penalizing Confident Output Distributions." arXiv preprint arXiv:1701.06548 (2017) 12 pages 2017.
Herrada, "Music Recommendation and Discovery in the Long Tail," 252 pages dated 2008.
Saito et al., "Prediction of Information Diffusion Probabilities for Independent Cascade Model," 9 pages, Japan, dated 2008.

\* cited by examiner

Training Instance 170A

Input Instance = <SR1, SR2, SR3> 171A

Output Instance = <S1=0, S2=0, S3=0, S4=1, ..., S9=0, ... SN=0> 172A

Training Instance 170B

Input Instance = <SR1, SR2, SR3, SR4> 171B

Output Instance = <S1=0, S2=0, S3=0, S4=0, S5=1, ..., S9=0, ... SN=0> 172B

Training Instance 170C

Input Instance = <SR1, SR2, SR3, SR4, SR5> 171C

Output Instance = <S1=0, S2=0, S3=0, S4=0, S5=0, S6=1, ..., S9=0, ... SN=0> 172C

⋮

Training Instance 170H

Input Instance = <SR1, SR2, SR3, ..., SR8> 171H

Output Instance = <S1=0, ... SN=0> 172H

TRAINING AND/OR UTILIZING RECURRENT NEURAL NETWORK MODEL TO DETERMINE SUBSEQUENT SOURCE(S) FOR ELECTRONIC RESOURCE INTERACTION

BACKGROUND

In many situations, a user's interaction with an electronic resource may be dependent on the diffusion of past interaction(s) with the electronic resource. As one example, assume there is a particular funny online video of a cat. A particular user may be more likely to interact with (e.g., view, share, comment on) the particular video if it is "shared" with the particular user by acquaintance A than if it was instead "shared" with the particular user by acquaintance B.

SUMMARY

Implementations of this specification are directed to training and/or utilizing a neural network model to determine, based on a sequence of sources that each have an electronic interaction with a given electronic resource, one or more subsequent source(s) for interaction with the given electronic resource.

As one example, assume an observed chronologically ordered sequence of sources that have each electronically shared a link to a particular cat video. For instance, the sequence of sources may indicate that Source A shared the link with Source B, Source B shared the link with Source C, Source C shared the link with Source D, and so forth. Source representations of those sources can be sequentially applied (in an order that conforms to the ordered sequence) as input to a trained recurrent neural network model as described herein. Output can be generated over the trained recurrent neural network model based on the applied input, where the output indicates, for each of a plurality of additional sources (e.g., thousands of additional sources), a probability that the additional source will subsequently (e.g., next) interact with (e.g., share, view) the particular cat video. Such probabilities indicated by the output can be utilized in performance of further electronic action(s) related to the particular cat video. For instance, information related to the particular cat video (e.g., a link to the particular cat video) can be transmitted to client device(s) associated with additional source(s) that have a corresponding probability satisfying a threshold. Also, for instance, one or more of the probabilities can be analyzed (e.g., collectively) to determine likelihood and/or extent of further diffusion of the cat video, which can be used in ranking the particular cat video, determining whether and/or how to transmit information related to the cat video, etc. In some implementations, the output generated over the trained recurrent neural network model additionally or alternatively indicates a general probability that the particular cat video will be further interacted with (e.g., a general probability that, given the observed chronologically ordered sequence of sources, indicates likelihood of further diffusion of the cat video). Such general probability can likewise be used in ranking the particular cat video, determining whether and/or how to transmit information related to the cat video, etc.

In some additional or alternative implementations, source representations of the sequence of sources with observed interactions can be sequentially applied as input to the neural network model, followed by a given source representation of a given source that has yet to interact with the particular cat video. Continuing with the above example, output generated over the trained neural network model based on such applied input can indicate, for each of a plurality of additional sources, a probability that the additional source will subsequently (e.g., next) interact with (e.g., share, view) the particular cat video. Also, for example, the output can additionally or alternatively include a general probability as described above. Such probabilities (for the additional sources) and/or general probability provide an indication of likelihood and/or extent of further diffusion of the cat video if the given source interacts with the particular cat video, which can be used in ranking the particular cat video for the given source, determining whether and/or how to transmit information related to the cat video to a client device of the given source, etc.

In some implementations, a resource representation of a given resource can also be applied to the recurrent neural network model in addition to applying the source representations of the sequence of sources. The resource representation can be, for example, an embedding of the resource, such as an embedding generated based on applying features of content of the resource to a separate neural network model. In some of those implementations, the resource representation is applied repeatedly as input in combination with the source representations of the sequence of sources. For example, for a sequence of sources A, B, C, etc.: first input of a source representation of A in combination with the resource representation may be applied as input, followed by second input of a source representation of B in combination with the resource representation, followed by third input of a source representation of C in combination with the resource representation, etc.

Additional description of various implementations of training and utilizing a recurrent neural network model are provided herein. In various implementations, the recurrent neural network model is trained to capture complex dependencies in observed diffusions, such as dependencies that take into account both source representations in an observed diffusion, and the particular order of those source representations in the observed diffusion. For example, assume an observed diffusion with a current "ending" Source N. The trained neural network model can be utilized to determine probabilities for subsequent sources based not only on source representations of Source N and sources that precede Source N in the diffusion, but additionally on the particular order of the diffusion through all of the preceding sources to Source N (e.g., via recurrent features of the neural network model and the sequential application of the source representations according to the sequence of the diffusion). This may provide improved performance relative to other techniques that assume independence among sources in a diffusion, without consideration of the positions of the sources in the diffusion (e.g., without consideration of positions of multiple preceding and/or following nodes in the diffusion).

In some implementations, a method implemented by one or more processors is provided that includes determining a sequence of activated sources that each have an electronic interaction with a given electronic resource. The sequence orders the activated sources based on a chronological order of the electronic interactions with the given electronic resource by the activated sources. The method further includes applying, as input to a trained recurrent neural network model, source representations of the activated sources. Applying the source representations includes applying the source representations sequentially in an order that conforms to the determined sequence of the corresponding activated sources. The method further includes generating, over the trained recurrent neural network model based on applying the input, an output that includes a set of probability measures. Each of the probability measures of the set is associated with at least one corresponding candidate source of a plurality of candidate sources, and indicates a likelihood that the corresponding candidate source will interact next with the given electronic resource. The method further includes determining to provide, to a given candidate source of the plurality of candidate sources, information related to the given resource. Determining to provide the information to the given candidate source is based on a given probability measure, of the probability measures, that is associated with the given candidate source. The method further includes, in response to determining to provide the information to the given candidate source: transmitting, via a network interface, the information to a client device associated with the given candidate source.

These and other implementations may include one or more of the following features.

In some implementations, the method further includes applying, as additional input to the trained recurrent neural network model, a resource representation of the given resource. In those implementations, generating the set of probability measures over the trained recurrent neural network model is further based on applying the additional input. In some implementations, applying the resource representation includes: applying the resource representation sequentially in combination with each application of the source representations.

In some implementations, determining to provide the information to the given candidate source based on the given probability measure comprises determining to provide the information based on the given probability measure satisfying a threshold.

In some implementations, transmitting the information to the client device associated with the given candidate source occurs independent of receiving a query formulated based on user interface input provided via the client device.

In some implementations, each of the electronic interactions is an electronic sharing transmission from a corresponding one of the activated sources to another corresponding one of the activated sources, and the chronological order is the order of the electronic sharing transmissions.

In some implementations, the given probability measure is associated with only the given candidate source, and is associated with the given candidate source based on a position of the given probability measure in the set of probability measures.

In some implementations, determining to provide the information to the given candidate source based on the probability measure includes: selecting the given candidate source based on the probability measure satisfying a threshold; applying, as further input to the recurrent neural network, a given source representation of the given candidate source; generating, over the trained recurrent neural network model based on applying the further input, further output that includes a further set of probability measures; and determining to provide the information based on the further set of probability measures.

In some implementations, a method implemented by one or more processors is provided that includes identifying a diffusion instance from one or more computer readable media. The diffusion instance defines a sequence of activated source representations for a corresponding sequence of activated sources that each had an electronic interaction with a given electronic resource. The sequence orders the activated source representations based on a chronological order of the electronic interactions with the given electronic resource by the activated sources. The method further includes generating a training instance based on the diffusion instance. Generating the training instance includes: identifying a subset of the sequence of activated source representations; identifying a next activated source representation, of the activated source representations, that immediately follows the subset in the sequence; generating training instance input that includes the subset; and generating training instance output that includes training measures for each of a plurality of candidate sources. Generating the training instance output includes assigning a given training measure to the candidate source corresponding to the next activated source representation based on the next activated source representation immediately following the subset in the sequence. The method further includes applying, as input to a recurrent neural network model, the training instance input. Applying the training instance input includes applying the activated source representations sequentially in an order that conforms to the sequence of the subset. The method further includes generating output over the recurrent neural network model based on applying the input, and updating the recurrent neural network model based on comparison of the output to the training instance output.

These and other implementations may include one or more of the following features.

In some implementations, assigning the given training measure to the candidate source comprises assigning a maximum probability measure to the candidate source.

In some implementations, the method further includes identifying a further activated source representation, of the activated source representations, that immediately follows the next activated source representation in the sequence. In some of those implementations, generating the training instance output further includes: assigning an additional given training measure to the further activated source representation. The additional given training measure has a lesser magnitude than the given training measure based on the additional given training measure being for the further activated source representation following the next activated source representation in the sequence.

In some implementations, generating the training instance input further includes including a resource representation of the given resource in the training instance input, and applying the training instance input further includes applying the resource representation. In some of those implementations, applying the resource representation includes: applying the resource representation sequentially in combination with each application of the activated source representations.

In some implementations, updating the recurrent neural network model based on comparison of the output to the training instance output includes: generating a gradient based on the comparison of the output to the training instance output; and updating the recurrent neural network model based on the gradient.

In some implementations, the method further includes generating an additional training instance based on the diffusion instance. The additional training instance includes additional training instance input that is based on a different subset of the sequence of activated source representations, and includes additional training instance output that is based on a different next activated source representation that immediately follows the different subset in the sequence of activated source representations.

In some implementations, a method implemented by one or more processors is provided that includes: determining a sequence of activated sources that each have an electronic interaction with a given electronic resource; and applying, as input to a trained recurrent neural network model, source representations of the activated sources. Applying the source representations includes applying the source representations sequentially in an order that conforms to the determined sequence of the corresponding activated sources. The method further includes generating, over the trained recurrent neural network model based on applying the input, an output that includes a set of probability measures. Each of the probability measures of the set is associated with at least one corresponding candidate source of a plurality of candidate sources, and indicates a likelihood that the corresponding candidate source will interact next with the given electronic resource.

In some implementations, the method further includes applying, as additional input to the trained recurrent neural network model, a resource representation of the given resource. In those implementations, generating the set of probability measures over the trained recurrent neural network model is further based on applying the additional input. In some of those implementations, applying the resource representation includes applying the resource representation sequentially in combination with each application of the source representations.

In some implementations, applying the source representations sequentially in the order is to a first recurrent unit of the recurrent neural network model, and applying, as input to the trained recurrent neural network model, the source representations further includes: applying, the source representations in an opposite order to a second recurrent unit of the recurrent neural network model, the opposite order being opposite of the order. In some of those implementations, the recurrent unit is a long short-term memory unit.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
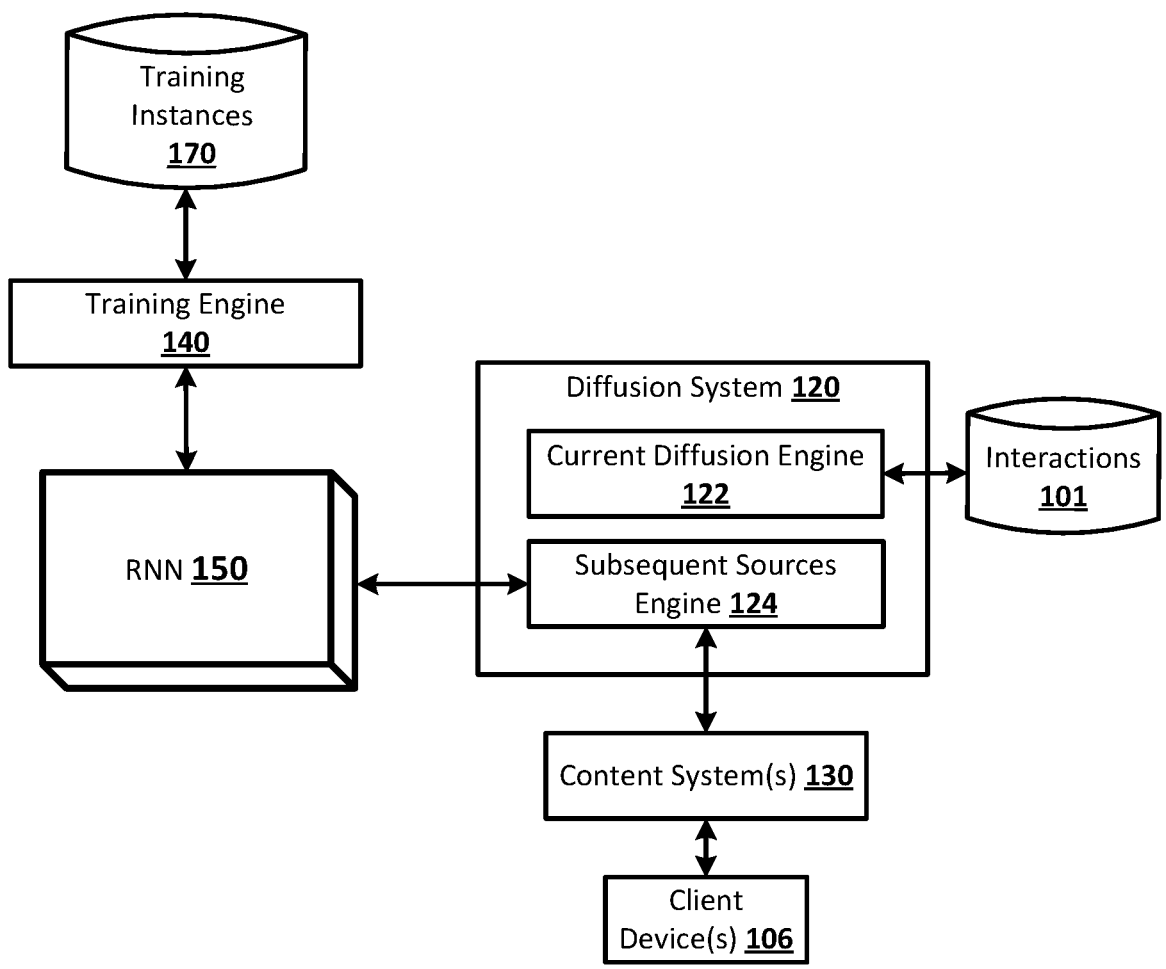
FIG. 1 is a block diagram of an example environment in which implementations disclosed herein may be implemented.

Implementations of this specification are directed to training and/or using a neural network model to determine, based on a sequence of sources that each have an electronic interaction with a given electronic resource, one or more subsequent source(s) for interaction with the given electronic resource. For example, source representations of those sources can be sequentially applied (in an order based on the ordered sequence) as input to a trained recurrent neural network model, and output generated over the trained recurrent neural network model based on the applied input, where the output indicates, for each of a plurality of additional sources, a probability that the additional source will subsequently (e.g., next) interact with the given electronic resource.

As used herein, a "source" references a particular entity, or a particular collection of entities, that has one or more features enabling its differentiation from other sources (e.g., from all other sources). Various identifiers may be utilized to differentiate sources from one another. Some sources described herein are websites or other sources that publish content on the Internet for consumption by a group of users (e.g., publically to all users or privately to a subgroup of users). Such sources may be defined with various levels of granularity. For example, "exampleurl.com" may be considered a source and given resources provided via any webpage associated with the sub-domain "exampleurl" considered to be interacted with by the source. As another example, "exampleurl.com/finance" (and/or "finance.exampleurl.com") may be considered a first source and "exampleurl.com/sports" (and/or "sports.exampleurl.com") may be considered a second source.

Some sources described herein are users, a collection of users, client devices, or collections of client devices. For example, a source may reference a particular user, or any user of a collection of users having one or more attributes in common (e.g., common sharing and/or other electronic interaction attributes). In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

As used herein, an "electronic resource" references content that can be rendered (e.g., audibly and/or graphically) by a computing device and that is accessible via the Internet and/or other network(s). Examples of electronic resources include an electronic image, an electronic document (e.g., a news story), a link (e.g., a hyperlink), a blog post, a social media post, an electronic video, an audio file, a subset of an electronic document (e.g., a particular "phrase"), etc.

As used herein, an "electronic interaction" with an electronic resource by a source references an interaction by a computing device of the source that causes the electronic resource to be rendered and/or transmitted by the computing device of the source. Examples of electronic interactions with an electronic resource include electronically sharing the electronic resource (e.g., a first user sharing the electronic resource with one or more additional users via a social network, a chat message, etc.), viewing and/or listening to the electronic resource via a computing device, publishing the electronic resource for consumption by one or more additional users (e.g., publishing of the resource to a website), etc.

It is understood that multiple interactions with a given resource, as used herein, does not require that each interaction is with the same instance of the given resource. In other words, multiple instances of a given resource may exist and an interaction with any one of those instances may constitute an interaction with the given resource. As one non-limiting example, a meme image may have a first instance that is a first size (e.g., 256×256) and of a first file type (e.g., .JPG), and a second instance that is a second size (e.g., 128×128) and of a second file type (e.g., GIF). A sequence of interactions with the given resource may include interactions with the first instance (including multiple co-existing versions of the first instance), the second instance (including multiple co-existing versions of the first instance), and/or other instances of the given resource.

As used herein, a "recurrent neural network model" references a neural network model that includes one or more recurrent neural network units to which input can be sequentially applied and, at each time step of applied input, the recurrent neural network unit(s) can be utilized to calculate a new hidden state based on the input of that time step and based on a current hidden state (that can be based on input(s) of prior time step(s)). A recurrent neural network model is also be referenced herein as an "RNN". As used herein, an RNN can also include one or more affine layers added "on top" of the recurrent neural network unit(s) of the RNN. An affine layer can be of the form $y=f(Wx+b)$, where x represents the input layers (e.g., the hidden state(s) of the RNN unit(s)), W represents the parameters, b is a bias vector, and f is a nonlinear activation function (e.g., a soft-max activation function). In some implementations, a recurrent neural network unit can be a long short-term memory ("LSTM") unit. In some implementations, additional or alternative recurrent neural network unit(s) may be utilized such as a gated recurrent unit ("GRU"). As described herein, in some implementations a bidirectional RNN is utilized that contains a first recurrent neural network unit used to operate on an input sequence in a first direction and a second recurrent neural network unit used to operate on the input sequence in an opposite direction. For example, assume source representations SR1, SR2, SR3, and SR4 are to be applied to a bidirectional RNN. The source representations may be applied sequentially to the first recurrent neural network unit in the order: SR1, SR2, SR3, SR4—and applied to the second recurrent neural network unit in the order: SR4, SR3, SR2, SR1. The outputs of the first and second recurrent neural network units can be combined (e.g., appended) and applied as input to downstream affine layer(s).

Turning now to FIG. 1, a block diagram is illustrated of an example environment in which implementations disclosed herein may be implemented. Although not illustrated in FIG. 1, the example environment can include one or more communication networks that facilitates communication between various components and/or subcomponents in the environment (e.g., via network interfaces of those components). Such communication network(s) may include a wide area network (WAN) such as the Internet, one or more intranets, and/or one or more bus subsystems—and may optionally utilize one or more standard communications technologies, protocols, and/or inter-process communication techniques.

The example environment of FIG. 1 includes a diffusion system 120, one or more content systems 130, one or more client devices 106, an RNN 150, and a training engine 140. The example environment also includes interactions database 101, and training instances database 170, which can each be stored on one or more computer readable media.

Diffusion system 120 and training engine 140 may each be implemented in one or more computing devices that communicate, for example, through a network. Diffusion system 120 and training engine 140 are example systems in which the systems, components, and techniques described herein may be implemented and/or with which systems, components, and techniques described herein may interface. They may each include one or more memories for storage of data and software applications, one or more processors for accessing data and executing applications, and other components that facilitate communication over a network. The operations performed by one or more of the system 120 and the engine 140 may each be distributed across multiple computer systems.

In various implementations, diffusion system 120 may include a current diffusion engine 122 and a subsequent sources engine 124. In some implementations, aspects of engines 122 and 124 may be omitted, combined, and/or implemented in a component that is separate from diffusion system 120.

The current diffusion engine 122 determines current observed diffusions based on interactions database 101. Each diffusion is a sequence of electronic interactions with a given resource, such as a temporally ordered sequence of electronic interactions with the given resource. Interactions database 101 may include various types of interactions and may optionally be maintained by one or more external systems and/or by diffusion system 120 itself.

As one example, interactions database 101 may include a temporally ordered sequence of website sources that have posted a link to a particular video and/or embedded the particular video. Such temporally ordered sequence may be included in the interactions database 101 by a web crawler or other indexing system and ordered based on time of first indexing of the link or embedding in association with the website sources (i.e., by times the indexing system first observed the links on the website sources). In such an example, the current diffusion engine 122 may determine a current diffusion of the video that is the temporally ordered sequence of website sources.

As another example, interactions database 101 may include a sequence of user sources that have shared a particular news story via a social network, that is ordered based on the time of sharing and/or the sharing path (e.g., User A shared with User B, who shared with User C). Such temporally ordered sequence may be included in the interactions database 101 by indexing or other system(s) of the social network and/or system(s) accessing the social network. In such an example, the current diffusion engine 122 may determine a current diffusion of the news story that is the temporally ordered sequence of user sources.

The current diffusion engine 122 can provide a current observed diffusion to the subsequent sources engine 124. The subsequent sources engine 124 applies, as input to RNN 150, source representation of the sources of the current observed diffusion. The subsequent sources engine 124 applies the source representations in an order that is based on the ordered sequence of the current observed diffusion. Various source representations can be utilized, such as source representations that are each an input vector that uniquely identifies a corresponding source. For example, the source representation of a given source can be an embedding of various attributes of the given source. For instance, attributes of a given source can include an identifier of the given source (e.g., a URL of a website source), social network attributes of the given source (e.g., a quantity of social connections, characteristics of social connections), geographic attributes of the given source, etc.

The subsequent sources engine 124 generates, over the RNN 150 based on the sequentially applied input, an output that indicates, for each of a plurality of additional sources, a probability that the additional source will subsequently (e.g., next) interact with the electronic resource of the diffusion. In some implementations, the output additionally or alternatively indicates a general probability of further interaction with the electronic resource of the diffusion. As described herein, in some implementations, the subsequent sources engine 124 also applies a resource representation of the resource of the diffusion to the recurrent neural network model in addition to applying the source representations of the sequence of sources of the diffusion.

The subsequent sources engine 124 provides one or more of the determined probabilities and/or one or more of the additional sources (e.g., those source(s) whose probability (ies) satisfy a threshold) to one or more content systems 130. The content system(s) 130 can each utilize such provided information in determining whether and/or how to provide information related to the resource of the diffusion to one or more client devices 106. The content system(s) 130 can include, for example, search systems (e.g., that utilize provided information to rank search results corresponding to the resource), personal assistant system(s) (e.g., that determine whether and/or how to "push" content recommendations corresponding to the resource), social network system(s) (e.g., that determine whether and/or how to present content recommendations corresponding to the resource), etc.

The training engine 140 utilizes training instances of training instances database 170 to train the RNN 150. The training instances can each be based on a corresponding past observed diffusion. In some implementations, the training engine 140 initially trains the RNN 150, then periodically (or non-periodically) further trains the RNN 150 based on new training instances of database 170 generated based on new (relative to the last training) observed diffusions.

Turning now to FIGS. 2A-4C, additional description is provided of the various components of FIG. 1.

Figures 2A, 2B:
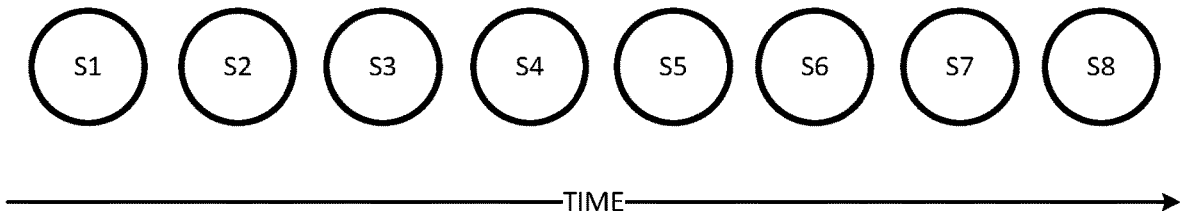
FIG. 2A illustrates an example of an observed sequence of activated sources that each have an electronic interaction with an electronic resource.
FIG. 2B illustrates an example of training instances that can be generated based on the observed sequence of FIG. 2A.

FIG. 2A illustrates an example of an observed sequence of activated sources that each have an electronic interaction with an electronic resource. In particular, FIG. 2A illustrates the time at which each of sources S1, S2, S3, S4, S5, S6, S7, and S8 had a corresponding electronic interaction with a given electronic resource. As illustrated, the temporally ordered sequence of interactions is: S1, S2, S3, S4, S5, S6, S7, S8.

As one example of FIG. 2A, the sources can be users, the electronic resource can be a particular meme image, and the interactions can each be a posting (e.g., to a social network) of the particular meme image. As another example of FIG. 2A, the sources can be users, the electronic resource can be a particular meme image, and the interactions can each be a sharing (e.g., via a social network) from a preceding source to a subsequent source (e.g., S1 shared with S2, S2 shared with S3, etc.). It is noted that in some of these and/or other implementations a diffusion may have a branched tree structure as opposed to the linear structure illustrated in FIG. 2A. In some of those implementations, training instances of FIG. 2B may be generated based on so-called deep walks and/or other traversals of the branched tree structure.

FIG. 2B illustrates an example of training instances 170A, 170B, 170C, and 170H that can be generated based on the observed sequence of FIG. 2A. In other implementations, more or fewer training instances may be generated based on the observed sequence of FIG. 2A. For example, additional training instances may be generated as indicated by the ellipsis of FIG. 2B. In some implementations, training engine 140 and/or another engine may generate the training instances of FIG. 2B based on past observed interactions of interactions database 101, such as interactions that have been determined to be "completed" or satisfy some other criteria (e.g., an "age" criteria).

Training instance 170A includes training input instance 171A that includes the sequence <SR1, SR2, SR3>, which is a sequence of source representations (each represented by SRX) for the sources S1, S2, and S3 of the sequence of FIG. 2A.

Training instance 170A also includes output instance 172A. Output instance 172A includes a vector whose elements each correspond to one or more sources (e.g., each corresponds to a corresponding single source), where the measures for each of the elements indicates a measure that is a training probability that the corresponding source(s) subsequently interact with the resource in the diffusion of the input instance 171A. In particular, output instance 172A includes elements that correspond to sources S1, S2, and S3, and they each have a measures of "0" since they do not subsequently interact with the resource in the diffusion of the input instance 171A (rather, they have already interacted with the resource). Output instance 172A also includes an element that corresponds to source S4, and it has a measure of "1" since it is the next source to interact with the resource in the diffusion of the input instance 171A (since it immediately follows S3 in the sequence of FIG. 2A). Elements that correspond to sources S9 through SN (where N is an integer) have measures of "0" since they do not subsequently interact with the resource in the diffusion of the input instance 171A (rather, they are not included in the sequence of FIG. 2A).

Elements that correspond to sources S5, S6, S7, and S8 are not illustrated in output instance 172A, but are present as indicated by the ellipsis between "S4=1" and "S9=0" in output instance 172A. In some implementations, each of the elements that correspond to sources S5, S6, S7, and S8 may be assigned a measure of "0" since they are not the "next source" to interact with the resource in the diffusion of the input instance 171A (since S4 is instead the "next source"). In some other implementations, the elements that correspond to sources S5, S6, S7, and S8 may each be assigned a corresponding measure that is less indicative of probability than the measure assigned to the element corresponding to S4, but more indicative of probability than a "no probability" measure. For example, the further the source is from the "next source" in the sequence, the less indicative of probability it can be. For instance, the element that corresponds to source S5 may be assigned a measure of "0.8", the element that corresponds to source S6 may be assigned a measure of "0.6", the measure that corresponds to source S7 may be assigned a measure of "0.4", and the measure that corresponds to source S8 may be assigned a measure of "0.2". As another particular example, any element corresponding to a source that is subsequent to the "next source" in a sequence can be assigned a weight that is based on $1/\exp(\alpha(k))$, where k is how many positions past the "next source" the source is in the sequence, and where $\alpha \in [0, \infty]$ is a hyper-parameter governing the weighting. For example, assume $\alpha=1.0$. In such an example, for output instance 172A, the element that corresponds to source S5 would be assigned a measure of "0.37" ($1/\exp(1.0(1))$), the element that corresponds to source S6 may be assigned a measure of "0.13" ($1/\exp(1.0(2))$), etc.

Training instance 170B includes training input instance 171B that includes the sequence <SR1, SR2, SR3, SR4>, which is a sequence of source representations (each represented by SRX) for the sources S1, S2, S3, and S4 of the sequence of FIG. 2A.

Training instance 170B also includes output instance 172B. Output instance 172B is a vector with the same elements (dimension) as output instance 172A, but includes different measures than that of output instance 172A. The different measures are included due to the training input instance 171B varying from that of training input instance 171A (i.e., 171B also includes SR4). For example, the element corresponding to source S4 has a measure of "0" in output instance 172B, whereas it has a measure of "1" in output instance 172A. This is because of the different input instance 171B where source S4 does not subsequently interact with the resource in the diffusion of the input instance 171B (rather, it already interacted with the resource in input instance 171B). As another example, the element corresponding to source S5 has a measure of "1" in output instance 172B since it is the next source to interact with the resource in the diffusion of the input instance 171B (since it immediately follows S4 in the sequence of FIG. 2A)—whereas source S4 was instead the next source in output instance 172A.

Elements that correspond to sources S6, S7, and S8 are not illustrated in output instance 172B, but are present as indicated by the ellipsis between "S5=1" and "S9=0" in output instance 172B. In some implementations, each of the elements that correspond to sources S6, S7, and S8 may be assigned a measure of "0" in output instance 172B since they are not the "next source" to interact with the resource in the diffusion of the input instance 171B (since S5 is instead the "next source"). In some other implementations, the elements that correspond to sources S6, S7, and S8 may each be assigned a corresponding measure that is less indicative of probability than the measure assigned to the element corresponding to S5, but more indicative of probability than a "no probability" measure. For example, the further the source is from the "next source" in the sequence, the less indicative of probability it can be.

Training instance 170C includes training input instance 171C that includes the sequence <SR1, SR2, SR3, SR4, SR5>, which is a sequence of source representations (each represented by SRX) for the sources S1, S2, S3, S4, and S5 of the sequence of FIG. 2A.

Training instance 170C also includes output instance 172C. Output instance 172C is a vector with the same elements (dimension) as output instances 172A and 172B, but includes different measures than that of output instances 172A and 172B. For example, the elements corresponding to sources S4 and S5 have measures of "0" in output instance 172C since those sources do not subsequently interact with the resource in the diffusion of the input instance 171C (rather, they already interacted with the resource in the input instance 171C). As another example, the element corresponding to source S6 has a measure of "1" in output instance 172C since it is the next source to interact with the resource in the diffusion of the input instance 171C (since it immediately follows S5 in the sequence of FIG. 2A).

Elements that correspond to sources S7 and S8 are not illustrated in output instance 172C, but are present as indicated by the ellipsis between "S6=1" and "S9=0" in output instance 172C. In some implementations, each of the elements that correspond to sources S7 and S8 may be assigned a measure of "0" in output instance 172C since they are not the "next source" to interact with the resource in the diffusion of the input instance 171C (since SC is instead the "next source"). In some other implementations, the elements that correspond to sources S7, and S8 may each be assigned a corresponding measure that is less indicative of probability than the measure assigned to the element corresponding to S6, but more indicative of probability than a "no probability" measure. For example, the further the source is from the "next source" in the sequence, the less indicative of probability it can be.

Training instance 170H includes training input instance 171H that includes the sequence <SR1, SR2, SR3, SR4, SR5, SR6, SR7, SR8>, which is a sequence of source representations (each represented by SRX) for all of the sources of the sequence of FIG. 2A.

Training instance 170H also includes output instance 172H. "0" is used as the probability measure for all elements of the output instance 172H since there are no further source interactions that follow the input instance 171H in the sequence of FIG. 2A. In other words, the input instance 171H concludes with a source representation of a source that ends the diffusion of FIG. 2A. As a result, no further interactions occur after the interaction of source S8 and "0" probability measures are thus utilized in the output instance 172H to demonstrate such lack of further interactions given the input instance 171H.

Although particular training instances are illustrated in FIG. 2B, additional and/or alternative training instances may be generated based on sequence of interactions of FIG. 2A. For example, a training instance can be generated that includes training instance input that doesn't start with a source representation of source S1. For instance, a training instance can include a training input instance of "<S3, S4, S5>". Also, it is noted that additional training instances will be generated on additional sequences of diffusion that vary from that of FIG. 2A (e.g., include a much larger quantity of activated sources, include different activated sources, different ordering of activated sources, are based on different type(s) of interaction, are based on interactions with different electronic resources, etc.)

It is also noted that indicators of the sources (i.e., "S1", "S2", etc.) are depicted in the output instances 172A, 172B, 172C, and 172H of FIG. 2A for assistance in comprehension. However, in many implementations, the output instances can include just the probability measures without the indicators—and each element of an output instance can be correlated to corresponding source(s) based on a stored mapping between elements and sources. Also, it is noted that although "1" is utilized in FIG. 2B as the highest probability and "0" utilized as the lowest probability, other probability measures may be utilized (e.g., "10" is the highest and "1" is the lowest"). Also, although the output instances of FIG. 2A are each illustrated as a vector, a matrix or other format may alternatively be utilized. Additional and/or alternative variations can be utilized.

In some implementations, the output instances 172A, 172B, 172C, and 172H of FIG. 2A may each further each include a corresponding general probability measure. For example, an extra element can be added to each of the output instances 172A, 172B, 172C, and 172H and a corresponding general probability measure defined for that extra element. Each general probability measure indicates whether there are further source interactions that follow the input instance in the sequence on which the input instance is based. In other words, each general probability measures indicates whether the last source representation of the input instance is the "end" of the sequence. In this manner, the general probability measure indicates whether further diffusion occurs beyond the input instance.

As one example, the output instances 172A, 172B, 172C can each include an extra element with a general probability measure of "0", where "0" indicates that further diffusion does occur beyond the corresponding input instances 171A, 171B, 171C. In other words, "0" can be utilized as the general probability measure for each of the output instances 172A, 172B, 172C since none of the input instances 171A, 171B, 171C concludes with a source representation of the source (S8) that ends the sequence of FIG. 2A. On the other hand, the output instance 170H can include an extra element with a general probability measure of "1", where "1" indicates that further diffusion does not occur beyond the input instance 171H. In other words, "1" can be utilized as the general probability measure for the output instance 170H since input instance 171H concludes with a source representation of the source (S8) that ends the sequence of FIG. 2A. Through training based on output instances that each include a general probability measure, the RNN 150 can be trained to enable generation, for a given sequence of source representations, of a general probability that indicates a likelihood of further diffusion. Continuing with the preceding examples, a generated general probability of "1" can indicate the given sequence concludes with the likely "end" of the diffusion (i.e., further diffusion is highly unlikely), whereas a general probability of "0" can indicate the given sequence is likely not the "end" of the diffusion (i.e., further diffusion is highly likely), with values between "0" and "1" indicating various intermediary likelihoods.

Figure 3:
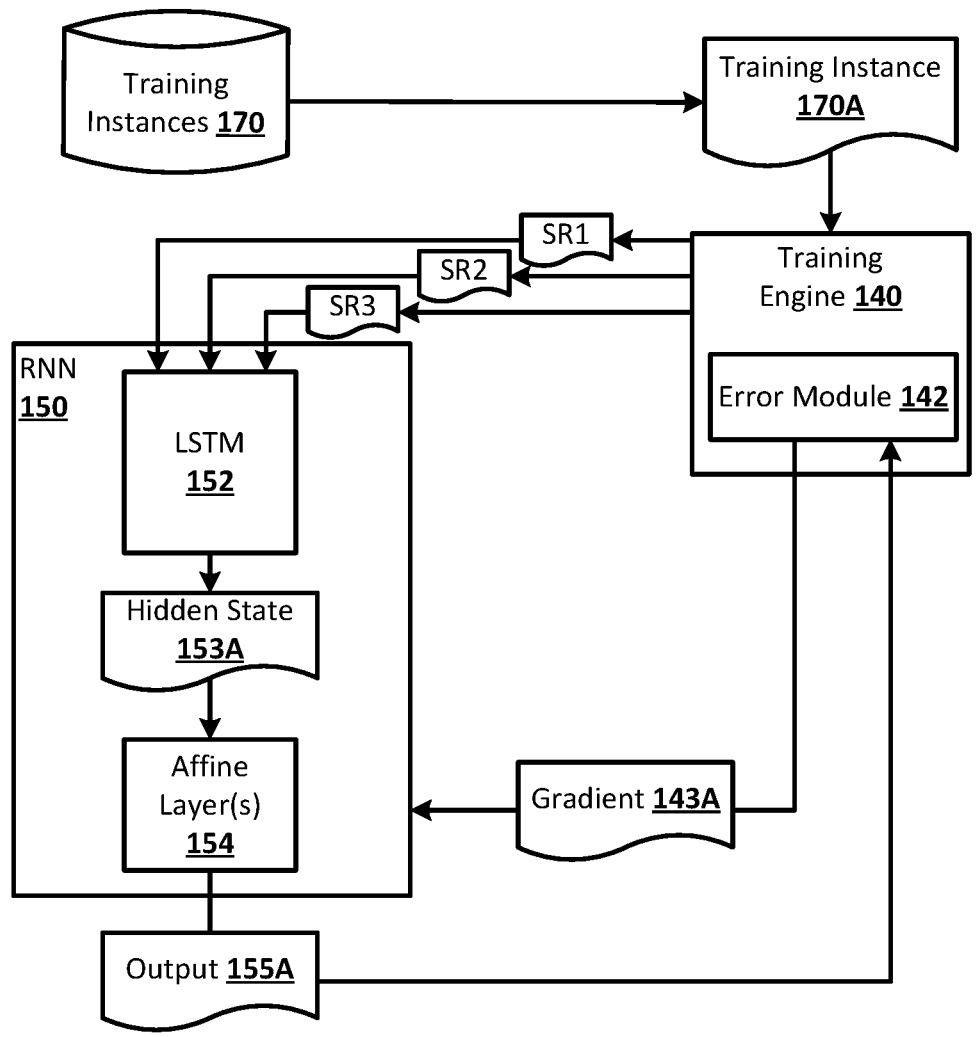
FIG. 3 illustrates an example of training a recurrent neural network model based on one of the training instances of FIG. 2B.

FIG. 3 illustrates an example of training RNN 150 based on the training instance 170A of FIG. 2B. In FIG. 3, the training engine 140 retrieves the training instance 170A from training instances database 170. The training engine 140 sequentially applies, as input to an LSTM unit 152 of RNN 150, the source representations of the input instance 171A of training instance 170A. In particular, as illustrated, the training engine 140 applies the source representation SR1, followed by the source representation SR2, followed by the source representation SR3.

The training engine 140 generates, based on the application of the input instance 171A to the LSTM unit 152, a hidden state 153A that is a representation of the sequence SR1, SR2, SR3 based on the current training of the LSTM unit 152.

The training engine 140 further applies the hidden state 153A as input to affine layer(s) 154 of the RNN 150. The training engine 140 generates, over the affine layer(s) 154 based on application of the hidden state 153A, output 155A. The output 155A is based on the hidden state 153A and the current training of the affine layers 154 and has a dimension that conforms to the dimension of the output instance 172A of the training instance 170A. For example, a last affine layer of the affine layer(s) 154 can be of the form y=f(Wx+b), where y represents the output 155A, x represents the input to that last affine layer, W represents the parameters, b is a bias vector, and f is a soft-max activation function.

The error module 142 of the training engine 140 generates a gradient 143A based on comparison of the output 155A to the output instance 172A and updates the RNN 150 based on the gradient 143A. For example, the error engine can back-propagate gradient 143A over the affine layers 154 and/or the LSTM unit 152.

Although FIG. 3 is illustrated with respect to a single training instance, it is understood that during training of the RNN 150 a large quantity of training instances will be utilized in training the RNN 150. For example, training of the RNN 150 can be based on other training instances of FIG. 2B, and additional training instances based on additional diffusions. Also, although FIG. 3 is described with respect to a non-batch learning technique, batch learning may additionally and/or alternatively be utilized. Moreover, although FIG. 3 is described with respect to sequential application of training instance input that includes only source representations, in some implementations the instance input of a training instance may further include a resource representation of a given resource on which a diffusion of the training instance is based. In such implementations, the input dimensions of the LSTM unit 152 may be expanded to accommodate the resource representation as input.

Also, although FIG. 3 is illustrated with LSTM unit 152, in some implementations an additional LSTM unit may be provided and used to operate on a sequence in a direction that is opposite of that utilized in conjunction with LSTM unit 152. For example, training engine 140 may generate hidden state 153A as described above by sequentially applying, as input to LSTM unit 152, SR1, SR2, and SR3 in that order. Training engine 140 may further generate an additional hidden state by sequentially applying, as input to an additional LSTM unit, SR3, SR2, and SR1 in that order. The hidden state 153A and the additional hidden state may then be combined and applied by the training engine 140 as input to the affine layer(s) 154. The training engine 140 may then generate output over the affine layer(s) 154 based on the applied combined hidden states. The error module 142 can update the model (including both LSTM units) based on a gradient determined based on comparison of the output to the output instance 172A.

As one particular example of the RNN 150 and the training of FIG. 3, assume that at each time step (t (1≤t≤k)), the LSTM unit 152 is utilized to produce a hidden state $h_t$ which is based on the so-far applied input of a sequence of a training instance $(x_{[1}\ldots{}_{t]})$. For example, with training instance 170A the hidden state $h_1$ is based on the so-far applied input of SR1, the hidden state $h_2$ is based on the so-far applied input of SR1 and SR2, and the hidden state $h_3$ is based on the so-far applied input of SR1, SR2, and SR3. The hidden state $h_t$ of the LSTM unit 152 can be determined based on $h_t = o_t \odot \tan h(c_t)$, where the forget gate vector of LSTM unit 152 $(f_t) = \tan h(W_f \cdot [h_{t-1}, x_t^j] + b_f)$; the input gate vector of LSTM unit 152 $(i_t) = \tan h(W_i \cdot [h_{t-1}, x_t] + b_i)$; the cell state vector of LSTM unit 152 $(c_t) = \tan h(f_t \odot c_{t-1} + i_t * d_t)$; and the output gate vector of LSTM unit 152 $(o_t) = \tan h(W_o \cdot [h_{t-1}, x_t] + b_o)$.

The state of the final step, $h_k$, is the hidden state generated over LSTM unit 152, for the sequentially applied training instance. The output (e.g., probability over all nodes for the next node to be infected) can be determined by applying the hidden state to the affine layer(s) 154, such as an affine layer with soft-max activation (e.g., soft-max($W_o \cdot h_t + b_o$)).

Figure 4A:
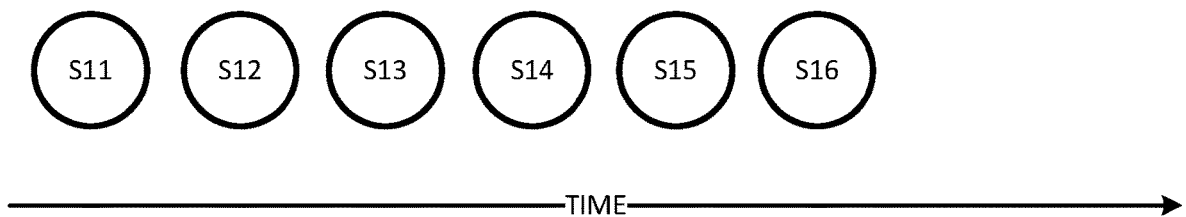
FIG. 4A illustrates another example of an observed sequence of activated sources that each have an electronic interaction with an electronic resource.
Figure 4B:
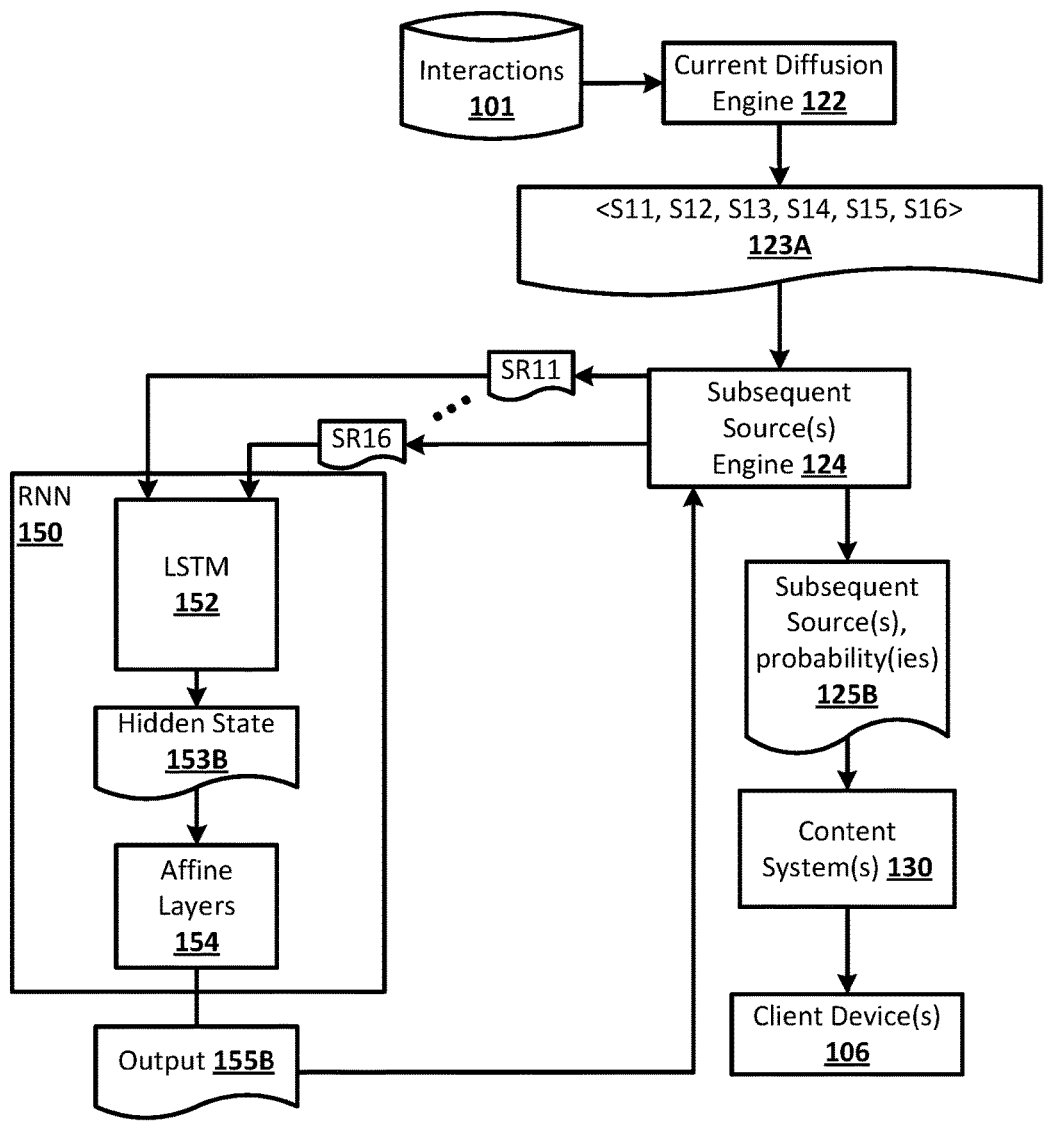
FIG. 4B illustrates an example of using a trained recurrent neural network model to determine subsequent sources and/or probabilities based on the observed sequence of FIG. 4A.
Figure 4C:
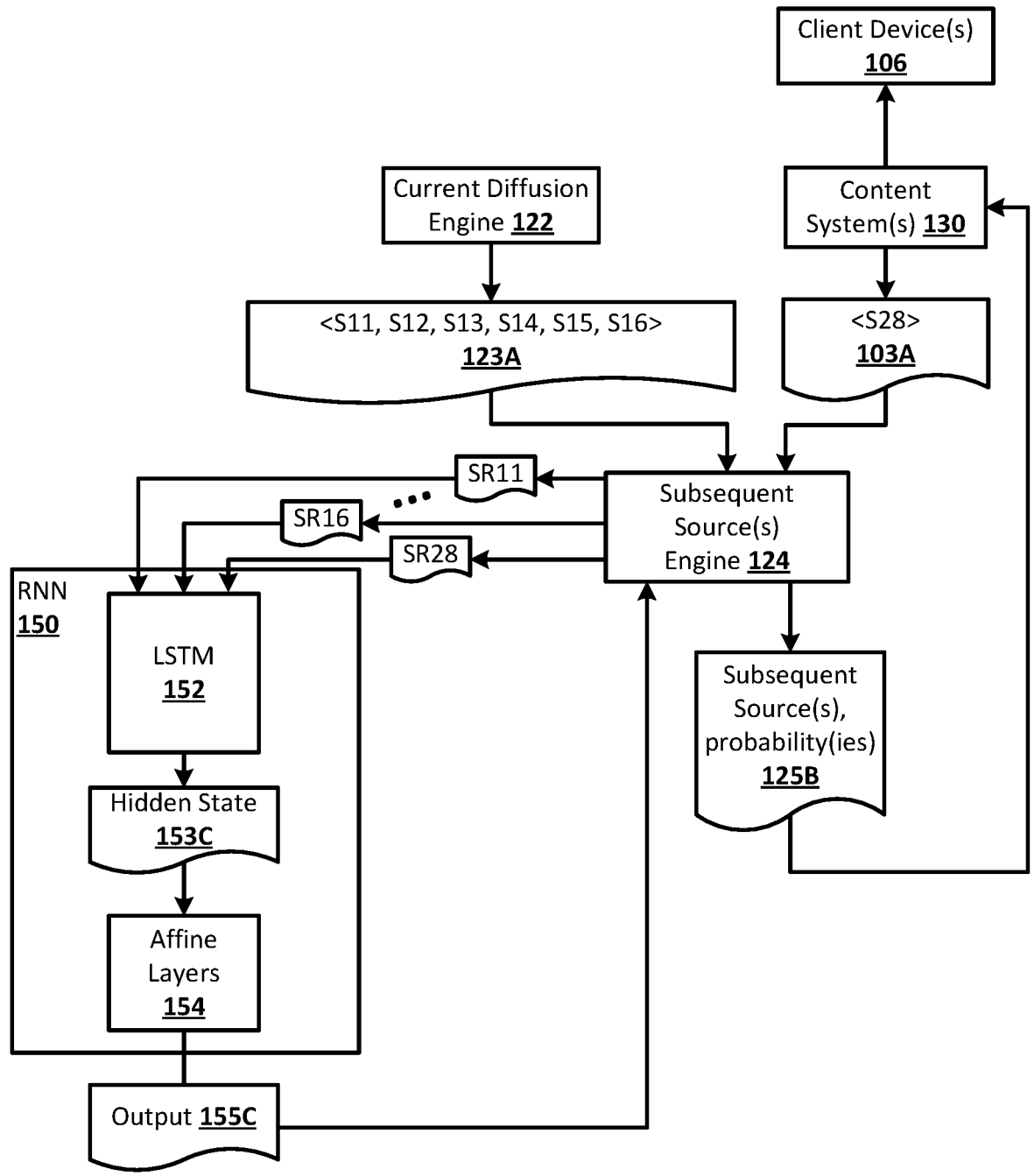
FIG. 4C illustrates an example of utilizing the trained recurrent neural network model to determine subsequent sources and/or probabilities if a given source interacts with the electronic resource following the observed sequence of FIG. 4A.

Turning now to FIGS. 4A-4C, examples of utilizing the trained RNN 150 are described. FIG. 4A illustrates an example of a "current" observed sequence of activated sources that each have an electronic interaction with an electronic resource. In particular, FIG. 4A illustrates the time at which each of sources S11, S12, S13, S14, S15, and S16 had a corresponding electronic interaction with a given electronic resource. As illustrated, the temporally ordered sequence of interactions is: S11, S12, S13, S14, S15, S16.

As one example of FIG. 4A, the sources can be users, the electronic resource can be a particular meme image, and the interactions can each be a posting (e.g., to a social network) of the particular meme image. As another example of FIG. 4A, the sources can be users, the electronic resource can be a particular meme image, and the interactions can each be a sharing (e.g., via a social network) from a preceding source to a subsequent source (e.g., S11 shared with S12, S12 shared with S13, etc.).

FIG. 4B illustrates an example of using a trained recurrent neural network model to determine subsequent sources and/or probabilities based on the observed sequence of FIG. 4B.

In FIG. 4B, the current diffusion engine 122 determines a sequence of activated sources 123A based on interactions database 101. The sequence of activated sources 123A correspond to the observed sequence of activated sources of FIG. 4A and includes the ordered sequence of activated sources S11, S12, S13, S14, S15, S16.

The current diffusion engine 122 provides the sequence of activated sources 123A to the subsequent sources engine 124. The subsequent sources engine 124 sequentially applies source representations of the sequence of activated sources 123A as input to the LSTM unit 152 of trained RNN 150. The subsequent sources engine 124 applies the source representations in an order that is based on the sequence of activated sources provided by current diffusion engine 122. For example, the subsequent sources engine 124 first applies source representation SR11 that is a representation of source S11, then applies source representation SR12 that is a representation of source S12, and continues sequentially applying source representations SR13, SR14, and SR15, until finally applying source representation SR16 that is a representation of source S16.

The subsequent sources engine 124 generates, based on the sequential application of the source representations, a hidden state 153B that is a representation of the sequentially applied sequence SR11, SR12, SR16.

The subsequent sources engine 124 further applies the hidden state 153B as input to affine layer(s) 154 of the RNN 150. The subsequent sources engine 124 generates, over the affine layer(s) 154 based on application of the hidden state 153B, output 155B.

The output 155B indicates, for each of a plurality of additional sources (e.g., thousands of additional sources), a probability that the additional source will subsequently (e.g., next) interact with the given resource interacted with by the activated sources of FIG. 4A. For example, the output 155B can be a vector of elements, with each element having a measure from "0" to "1". As described herein, each element can correspond to at least one (e.g., only one) source and each measure can indicate the probability that the corresponding source(s) will interact subsequently (e.g., next) with the given electronic resource. As also described herein, the output 155B can optionally also include an additional element with a measure that corresponds to a general probability measure. The general probability measure can indicate a general probability of subsequent interaction with the given electronic resource.

Based on the output 155B, the subsequent sources engine 124 provides an indication of subsequent source(s) and/or an indication of one or more probabilities 125B to one or more content systems 130. The subsequent sources engine 124 may also provide an indication of the given resource interacted with by the activated sources of FIG. 4A.

In some implementations, the subsequent sources engine 124 determines the source(s) having a probability, indicated in output 155B, that satisfies a threshold (e.g., greater than 0.5). In some of those implementations, the subsequent sources engine 124 provides, to one or more of the content systems 130, an indication of the given resource, an indication of those source(s), and optionally a corresponding probability measure for each of the source(s). The content system(s) 130 can utilize such provided content in determining whether and/or how to provide information related to the given resource, to client device(s) 106 associated with those resources.

For example, for a given source indicated by the subsequent sources engine 124, one of the content systems 130 can provide a push notification to a client device 106 associated with the given source, where the push notification includes the given resource or a link to the given resource. As another example, for a given source indicated by the subsequent sources engine 124, one of the content systems 130 can provide such a push notification to a client device 106 associated with the given source, only if a provided probability measure for the given source satisfies a threshold. As yet another example, for a given source indicated by the subsequent sources engine 124, one of the content system(s) 130 can determine a score of the given resource, for the user, based on a provided probability measure for the given source. For instance, if the given resource is a news article, one of the content systems can present a link to the given resource (e.g., in response to a use visit to a "news" page or feed) and a presentation order of the link relative to links to other news articles can be determined based on the score.

In some implementations, the subsequent sources engine 124 additionally or alternatively analyzes the output 155B to determine likelihood and/or extent of further diffusion of the given resource, and provides such likelihood and/or extent to one or more of the content systems 130. For example, if the output 155B indicates that few (or no) probability measures satisfy a threshold (and/or that a general probability measure satisfies a threshold), the subsequent sources engine 124 may determine further diffusion is unlikely and provide a corresponding indication to one of the content systems 130. That content system 130 can use the corresponding indication in determining not to push information related to the given resource to one or more client devices 106 and/or to demote information corresponding to the given resource if such information is provided. On the other hand, if the output 155B indicates that a large quantity of probability measures satisfy a threshold (and/or that a general probability measure satisfies a threshold), the subsequent sources engine 124 may determine further diffusion is likely and provide a corresponding indication to one of the content systems 130. That content system 130 can use the corresponding indication in determining to push information related to the given resource to one or more client devices 106 and/or to promote information corresponding to the given resource if such information is provided (e.g., to increase a ranking of search results corresponding to the given resource).

Although FIG. 4B is illustrated with respect to a single sequence of activated sources 123A, it is understood that the RNN 150 can be utilized to determine corresponding probabilities for each of multiple additional sequences of activated sources. Also, although FIG. 4B is described with respect to sequential application to RNN 150 of input that includes only source representations, in some implementations the input may further include a resource representation of the given resource of the sequence of interactions of FIG. 4A. In such implementations, the input dimensions of the LSTM unit 152 may be expanded to accommodate the resource representation as input.

Moreover, although FIG. 4B is illustrated with LSTM unit 152, in some implementations an additional LSTM unit may be provided and used to operate on a sequence in a direction that is opposite of that utilized in conjunction with LSTM unit 152. For example, subsequent sources engine 124 may generate hidden state 153B as described above by sequentially applying, as input to LSTM unit 152, SR11, SR12, SR13, SR14, SR15, and SR16 in that order. Subsequent sources engine 124 may further generate an additional hidden state by sequentially applying, as input to an additional LSTM unit, SR16, SR15, SR14, SR13, SR12, and SR11 in that order. The hidden state 153B and the additional hidden state may then be combined and applied as input to the affine layer(s) 154 to generate output over the affine layer(s) 154 based on the applied combined hidden states.

FIG. 4C illustrates an example of utilizing the trained recurrent neural network model to determine subsequent sources and/or probabilities if a given source interacts with the electronic resource following the observed sequence of FIG. 4A.

As in FIG. 4B, the current diffusion engine 122 provides the sequence of activated sources 123A to the subsequent sources engine 124.

The subsequent sources engine 124 further receives a given source 103A that is denoted as source 28 and is not one of the activated sources 123A. For example, one of the content system(s) 130 may provide the given source 103A to determine a probability that further diffusion will occur if the given resource, associated the activated sources 123A, is provided to the given source 103A.

The subsequent sources engine 124 sequentially applies source representations of the sequence of activated sources 123A as input to the LSTM unit 152 of trained RNN 150. The subsequent sources engine 124 applies the source representations in an order that is based on the sequence of activated sources provided by current diffusion engine 122. The subsequent sources engine then 124 applies, to the LSTM unit 152, a source representation SR28 that is a source representation of the given source 103A.

The subsequent sources engine 124 generates, based on the sequential application of the source representations SR11-SR16, and SR28, a hidden state 153C that is a representation of the sequentially applied sequence SR11, SR12, SR13, SR14, SR15, SR16, SR28.

The subsequent sources engine 124 further applies the hidden state 153C as input to affine layer(s) 154 of the RNN 150. The subsequent sources engine 124 generates, over the affine layer(s) 154 based on application of the hidden state 153C, output 155C.

The output 155C indicates, for each of a plurality of additional sources (e.g., thousands of additional sources), a probability that the additional source will subsequently (e.g., next) interact with the given resource interacted with by the activated sources of FIG. 4A—if the given source 103A next interacts following the activated sources 123A. For example, the output 155C can be a vector of elements, with each element having a measure from "0" to "1". As described herein, each element can correspond to at least one (e.g., only one) source and each measure can indicate the probability that the corresponding source(s) will interact subsequently (e.g., next) with the given electronic resource. As also described herein, the output 155C can optionally also include an additional element with a measure that corresponds to a general probability measure. The general probability measure can indicate a general probability of subsequent interaction with the given electronic resource.

Based on the output 155C, the subsequent sources engine 124 provides an indication of subsequent source(s) and/or an indication of one or more probabilities 125B to one or more content systems 130. The one or more content system 130 can utilize such information in determining whether and/or how to provide information related to the given resource, to one of the client devices 106 associated with the given source 103A. For example, if a large quantity of subsequent sources are likely to interact with the given resource if it is provided to the given source 103A, this may be viewed as a positive signal that the given resource is relevant to the given source 103A.

As with FIG. 4B, in some implementations of FIG. 4C the input applied to RNN 150 may further include a resource representation of the given resource of the sequence of interactions of FIG. 4A. Also, as with FIG. 4B, in some implementations an additional LSTM unit may be utilized in FIG. 4C to operate on a sequence in a direction that is opposite of that utilized in conjunction with LSTM unit 152.

Figure 5:
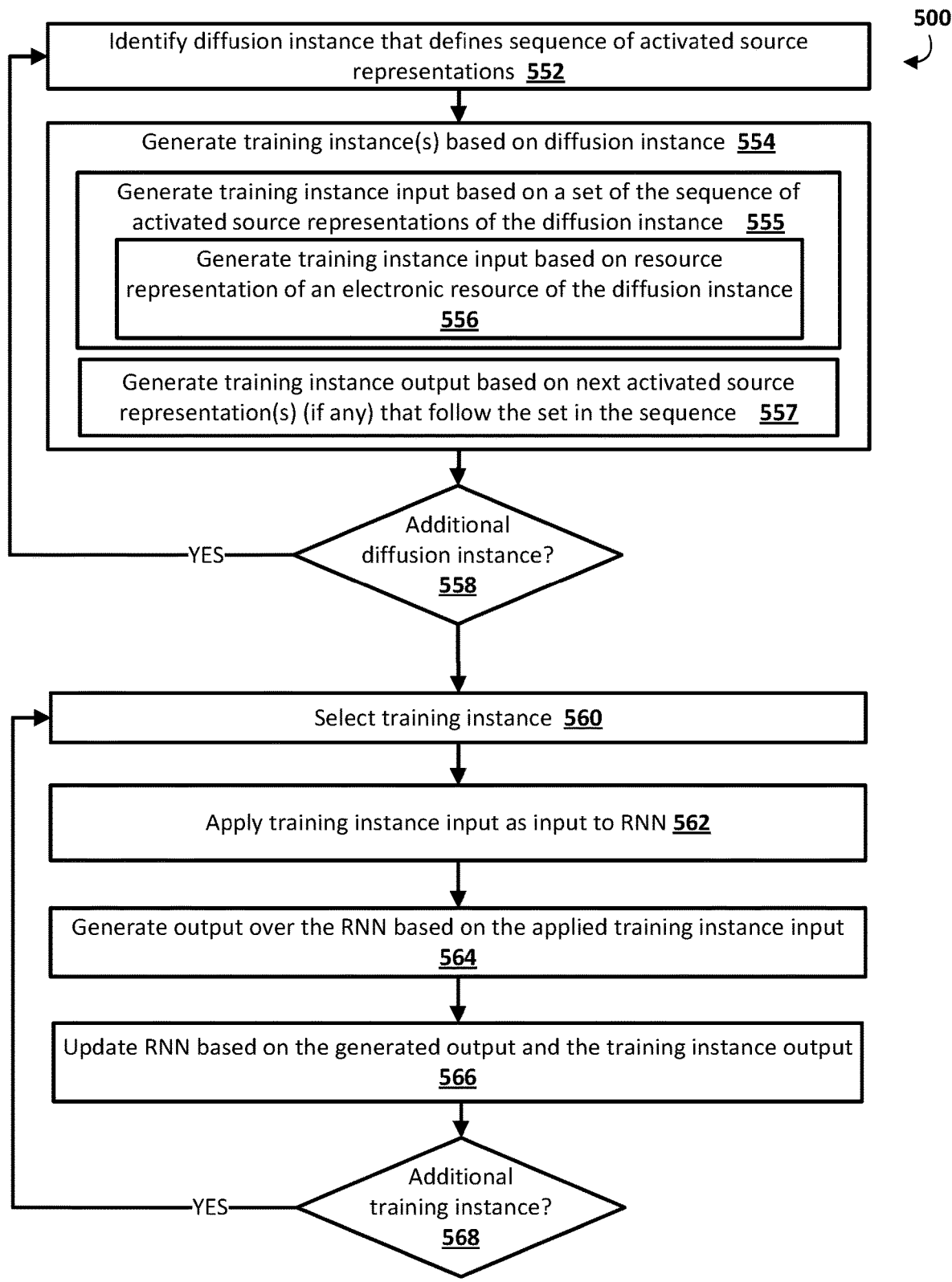
FIG. 5 is a flowchart illustrating a method of training a recurrent neural network model according to various implementations disclosed herein.

Turning now to FIG. 5, a flowchart illustrates a method 500 of training a recurrent neural network model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 500 are shown in a particular order, this is not meant to be limiting. One or more operations may be reordered, omitted or added.

At block 552, the system identifies a diffusion instance that defines a sequence of activated source representations.

At block 554, the system generates one or more training instances based on the diffusion instance of block 552. In some implementations, in generating a training instance based on the diffusion instance, block 554 includes sub block 555 and sub block 557.

At sub block 555, the system generates training instance input of a training instance based on a set of the sequence of the activated source representations of the diffusion instance. In some implementations, sub block 555 also includes further sub block 556, in which the system generates the training instance input of the training instance based on a resource representation of an electronic resource of the diffusion instance.

At sub block 557, the system generates training instance output of a training instance based on one or more next (e.g., the immediate next and optionally further next) activated source representations, if any, that follow the set in the sequence. For example, a vector element that corresponds to the immediate next activated source representation that follows the set in the sequence can be assigned a "1" measure. Also, for example, other vector elements that correspond to subsequent next activated source representations that follow the "immediate next" in the sequence can be assigned gradually decaying measures. Also, for example, other vector elements that do not correspond to subsequent next activated source representations can be assigned "0" measures. If no next activated source representations follow the set in the sequence (i.e., the set concludes at the end of sequence), the training instance output may include all "0" measures.

At block 558, the system determines if additional diffusion instances are available. If so, the system may proceed back to block 552 to identify an additional diffusion instance, then generate additional training instance(s) at block 554 based on such additional diffusion instance.

If not (or in parallel), the system may proceed to blocks 560, 562, 564, 566, and 568 and train an RNN based on generated training instances.

At block 560, the system selects a training instance.

At block 562, the system applies training instance input of the training instance as input to an RNN.

At block 564, the system generates output over the RNN based on the applied training instance input.

At block 566, the system updates the RNN based on the generated output and the training instance output. For example, the system can generate a gradient based on comparison of the generated output and the training instance output, and update the RNN based on the gradient.

At block 568, the system determines if additional training instances are available. If so (and optionally if other training criterion has not yet been satisfied), the system proceeds back to block 560 and selects an additional training instance. The system may then proceed to blocks 562, 564, and 566 the update the RNN based on the additional training instance.

It is understood that all or aspects of method 500 may be performed iteratively to train the RNN. Moreover, in some implementations, once initially trained, method 500 may still be performed periodically and/or at other interval to generate additional training instances based on additional diffusion instances, and further train the RNN based on such additional training instances.

Figure 6:
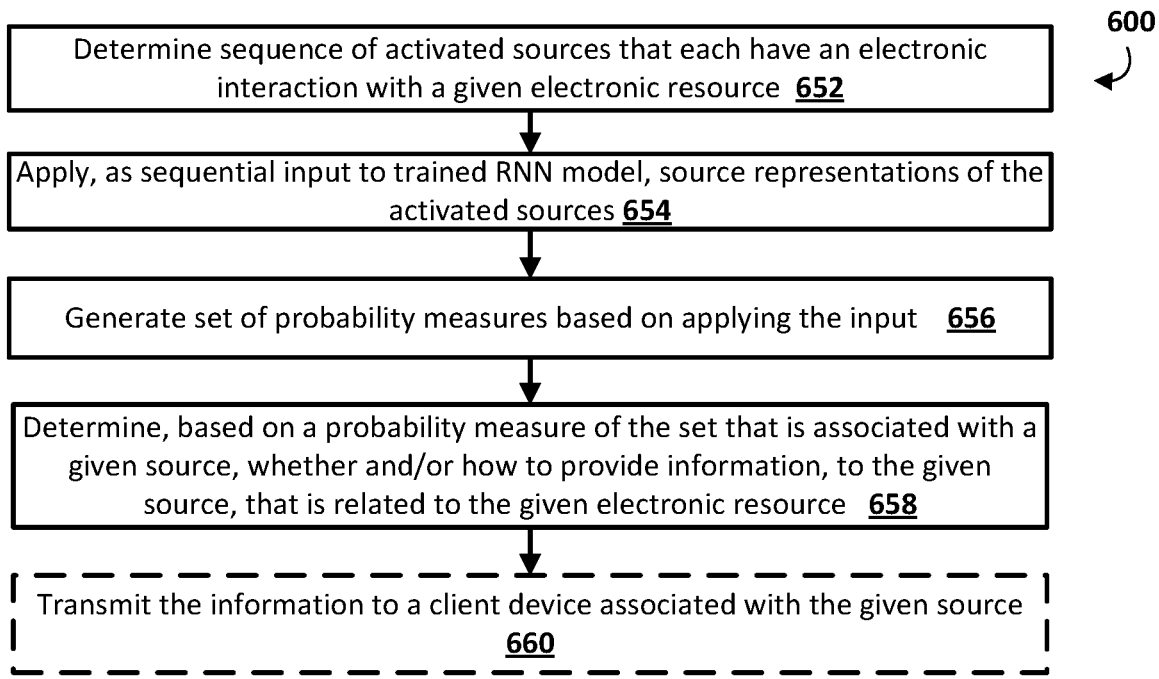
FIG. 6 is a flowchart illustrating a method of utilizing a trained recurrent neural network model according to various implementations disclosed herein.

Turning now to FIG. 6, a flowchart illustrates a method 600 of utilizing a trained recurrent neural network model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 600 are shown in a particular order, this is not meant to be limiting. One or more operations may be reordered, omitted or added.

At block 652, the system determines a sequence of activated sources that each have an electronic interaction with a given electronic resource.

At block 654, the system applies, as sequential input to a trained RNN model, source representations of the activated sources.

At block 656, the system generates, over the trained RNN model, a set of probability measures based on applying the sequential input.

At block 658, the system determines, based on a probability measure of the set that is associated with a given source, whether and/or how to provide information, to the given source, that is related to the given electronic resource.

At optional block 660, the system transmits the information to a client device associated with the given source.

Figure 7:
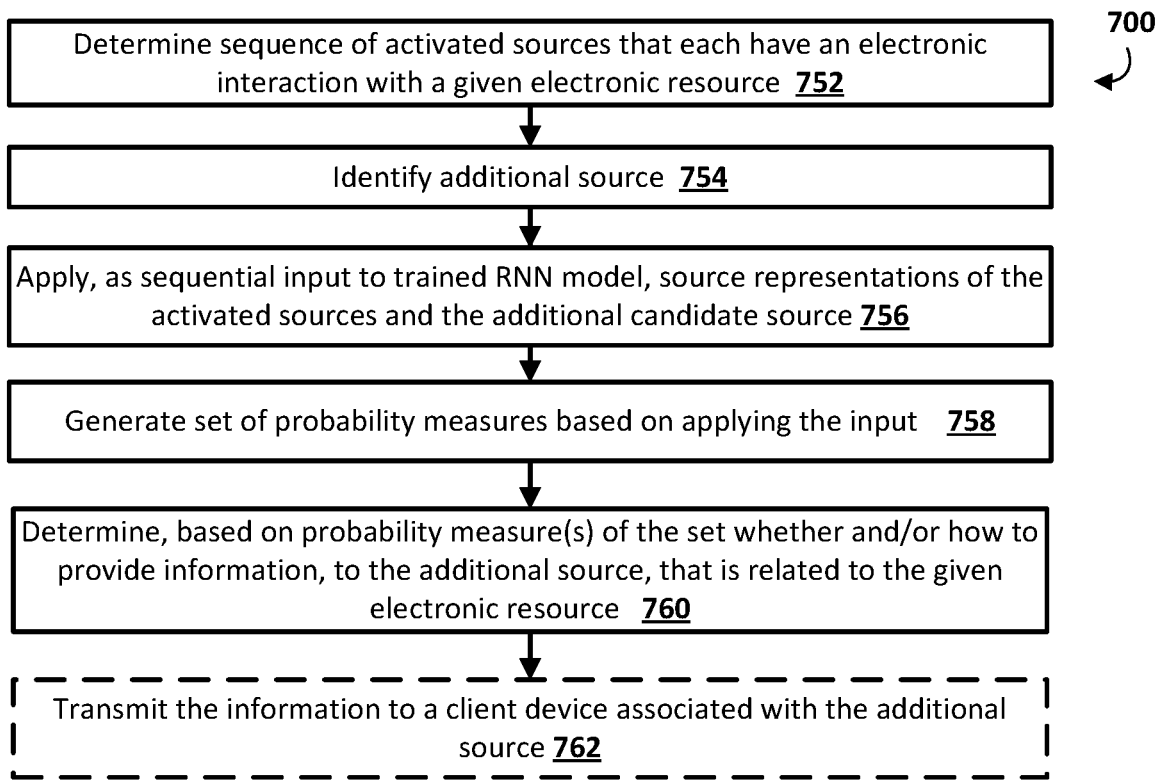
FIG. 7 is a flowchart illustrating another method of utilizing a trained recurrent neural network model according to various implementations disclosed herein.

Turning now to FIG. 7, a flowchart illustrates a method 700 of utilizing a trained recurrent neural network model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 700 are shown in a particular order, this is not meant to be limiting. One or more operations may be reordered, omitted or added.

At block 752, the system determines a sequence of activated sources that each have an electronic interaction with a given electronic resource.

At block 754, the system identifies an additional source that is not included in the sequence of activated sources. For example, the additional source can be an additional candidate source determined based on applying the sequence of activated sources to the trained RNN model (e.g., as in step 654 of method 600). For instance, the additional source can be an additional candidate source whose probability measure (e.g., generated in step 656 of method 600) satisfies a threshold.

At block 756, the system applies, as sequential input to a trained RNN model, source representations of the activated sources and a source representation of the additional candidate source.

At block 758, the system generates, over the trained RNN model, a set of probability measures based on applying the sequential input.

At block 760, the system determines, based on probability measure(s) of the set, whether and/or how to provide information, to the additional source, that is related to the given electronic resource.

At optional block 762, the system transmits the information to a client device associated with the additional source.

It is noted that in method 700 the additional candidate source can be included in a sequence of additional candidate sources. For example, a sequence of additional candidate sources (none of which are included in the sequence of block 752) can be identified at block 754. Further, at block 756 source representations of the additional candidate sources can be applied as sequential input (according to their sequence) to the trained RNN model, following the sequential application of the source representations of the activated sources. The probability generated at block 758 can thus be based on assuming the sequence of additional candidate sources interact with the given electronic resources following the activated sources. At block 760 the system can determine whether and/or how to provide information, that is related to the given electronic resource, to client device(s)

associated with one or more of the additional candidate sources. In this manner, the method 700 is adaptable to analyze additional candidate source interactions beyond "1 hop" in the future.

Figure 8A:
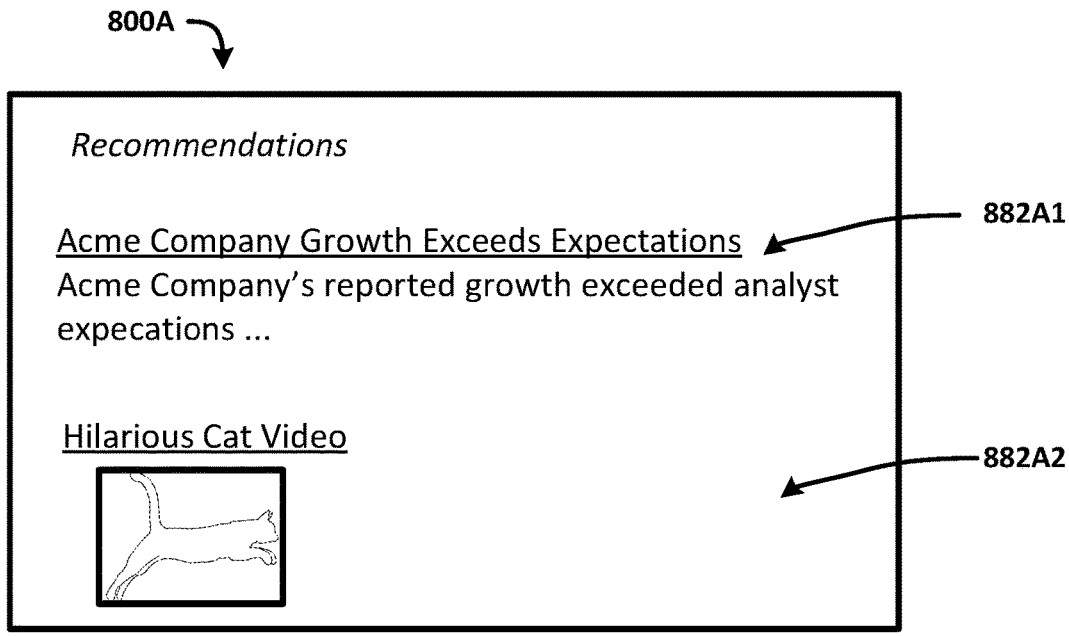
FIG. 8A and FIG. 8B each illustrate an example graphical user interface for providing information related to a given resource based on output generated over a recurrent neural network model.
Figure 8B:
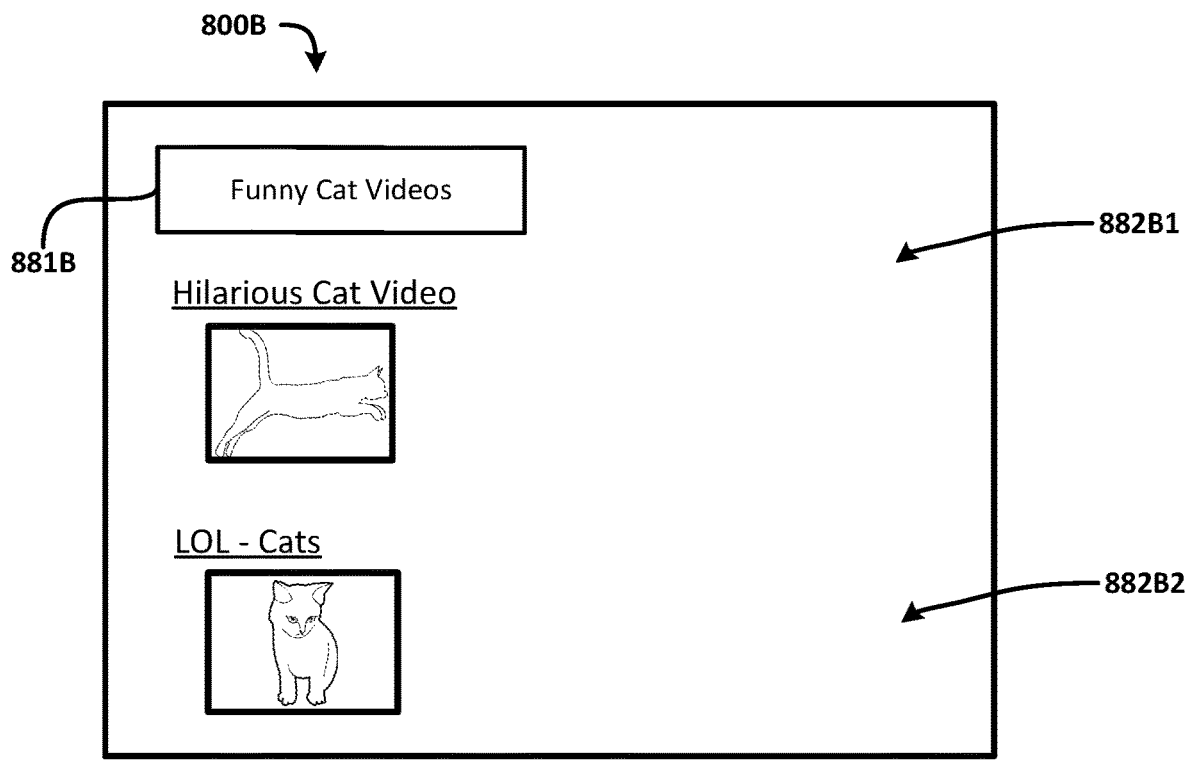

FIG. 8A and FIG. 8B illustrate example graphical user interfaces 800A and 800B for providing information related to a given resource based on output generated over a recurrent neural network model. The graphical user interfaces 800A and 800B may be presented at one of the client devices 106 (e.g., in a browser executing at a client device 106 and/or in a dedicated electronic communication application executing at a client device 106) in response to a transmission to the client device 106 by one of the content systems 130.

FIG. 8A illustrates an example of information 882A1 and information 882A2, that each include a link (e.g., the underlined text may be a hyperlink) to a corresponding electronic resource, and a "snippet" of information about the electronic resources. A user can select, via user interface input, a corresponding link to cause the client device 106 to navigate to the corresponding electronic resource. The information 882A1 and/or the information 882A2 may be provided as recommendations based on utilization of a RNN as described herein. For example, a current diffusion associated with the "Hilarious Cat Video" (associated with information 882A2) may be identified that includes a chronologically ordered sequence of sources that have interacted with that video. Source representations of those sources may be sequentially applied to an RNN to generate probabilities that each of a plurality of additional sources will subsequently interact with the video. The information 882A2 may be provided based on determining that a source associated with the interface 800A has a probability of subsequent interaction that satisfies a threshold.

FIG. 8B illustrates an example of information 882B1 and information 882B2, presented as search results in response to a search query 881B of "Funny Cat Videos". Each of the search results include a link (e.g., the underlined text may be a hyperlink) to a corresponding electronic resource, and a "snippet" of information about the electronic resources. A user can select, via user interface input, a corresponding link to cause the client device 106 to navigate to the corresponding electronic resource. The information 882B1 and/or the information 882B2 may be ranked (e.g., ordered in a search results list) based on utilization of a RNN as described herein. For example, a current diffusion associated with the "Hilarious Cat Video" may be identified that includes a chronologically ordered sequence of sources that have interacted with that video. Source representations of those sources may be sequentially applied to an RNN, followed by a source representation corresponding to the user that submitted the search query 881B, to generate probabilities that each of a plurality of additional sources will subsequently interact with the video—if the user that submitted the search query 881B also interacts. The ranking of the information 882B1 may be determined based on such probabilities. Although examples of graphical interfaces are presented in FIGS. 8A and 8B, it is understood that alternative forms of presenting (audibly and/or graphically) information related to resources may additionally or alternatively be utilized.

Figure 9:
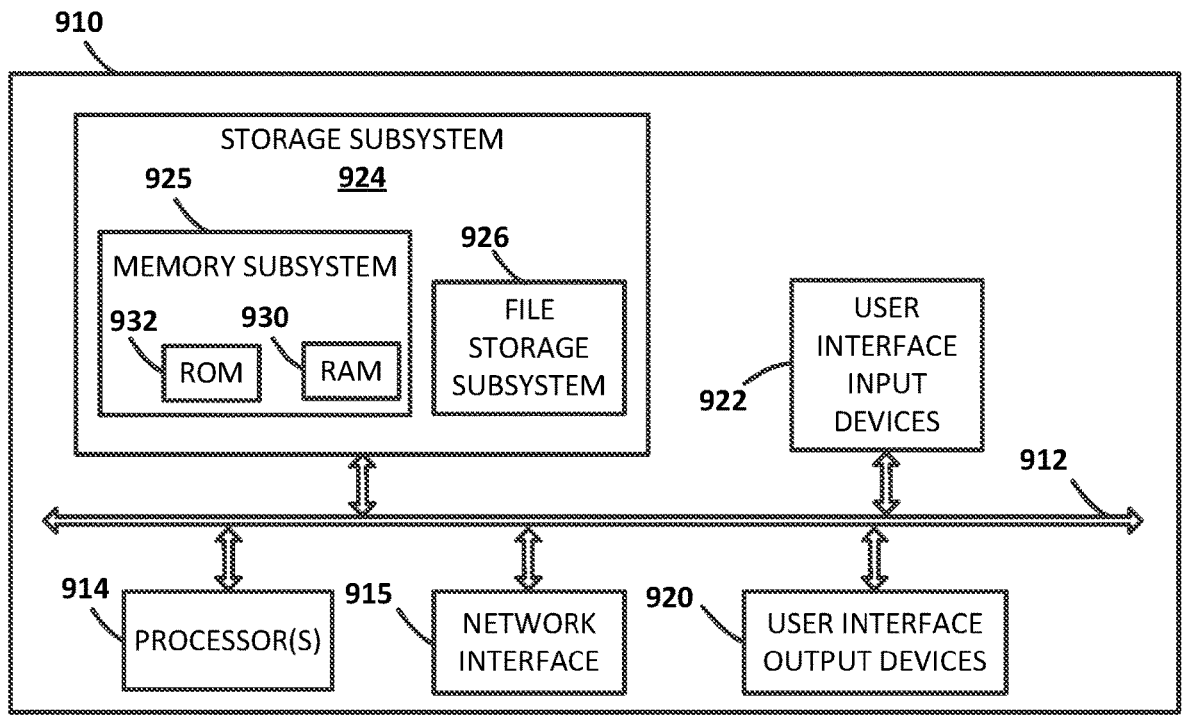
FIG. 9 illustrates an example architecture of a computing device.

FIG. 9 is a block diagram of an example computing device 910 that may optionally be utilized to perform one or more aspects of techniques described herein. Computing device 910 includes at least one processor 914 (e.g., a CPU, GPU, and/or TPU) which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 915. The input and output devices allow user interaction with computing device 910. Network interface subsystem 915 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods described herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   determining a sequence of activated sources that each have an electronic interaction with a given electronic resource,
      wherein the sequence orders the activated sources based on a chronological order of the electronic interactions with the given electronic resource by the activated sources;
   applying, as input to a trained recurrent neural network model, source representations of the activated sources,
      wherein applying the source representations comprises applying the source representations sequentially in an order that conforms to the determined sequence of the corresponding activated sources;
   generating, over the trained recurrent neural network model based on applying the input, an output that includes a set of probability measures,
      wherein each of the probability measures of the set is associated with at least one corresponding candidate source of a plurality of candidate sources, and indicates a likelihood that the corresponding candidate source will interact next with the given electronic resource; and
   determining to provide, to a given candidate source of the plurality of candidate sources, information related to the given electronic resource,
      wherein determining to provide the information to the given candidate source is based on a given probability measure, of the probability measures, that is associated with the given candidate source; and
   in response to determining to provide the information to the given candidate source:
      transmitting, via a network interface, the information to a client device associated with the given candidate source.

2. The method of claim 1, further comprising:
   applying, as additional input to the trained recurrent neural network model, a resource representation of the given electronic resource;
   wherein generating the set of probability measures over the trained recurrent neural network model is further based on applying the additional input.

3. The method of claim 2, wherein applying the resource representation comprises:
   applying the resource representation sequentially in combination with each application of the source representations.

4. The method of claim 1, wherein determining to provide the information to the given candidate source based on the given probability measure comprises determining to provide the information based on the given probability measure satisfying a threshold.

5. The method of claim 1, wherein transmitting the information to the client device associated with the given candidate source occurs independent of receiving a query formulated based on user interface input provided via the client device.

6. The method of claim 1, wherein each of the electronic interactions is an electronic sharing transmission from a corresponding one of the activated sources to another corresponding one of the activated sources, and the chronological order is the order of the electronic sharing transmissions.

7. The method of claim 1, wherein the given probability measure is associated with only the given candidate source, and is associated with the given candidate source based on a position of the given probability measure in the set of probability measures.

8. The method of claim 1, wherein determining to provide the information to the given candidate source based on the given probability measure comprises:
   selecting the given candidate source based on the given probability measure satisfying a threshold;
   applying, as further input to the trained recurrent neural network model, a given source representation of the given candidate source;
   generating, over the trained recurrent neural network model based on applying the further input, further output that includes a further set of probability measures; and
   determining to provide the information based on the further set of probability measures.

9. A method implemented by one or more processors, comprising:
   determining a sequence of activated sources that each have an electronic interaction with a given electronic resource,
      wherein the sequence orders the activated sources based on a chronological order of the electronic interactions with the given electronic resource by the activated sources;
   applying, as input to a trained recurrent neural network model, source representations of the activated sources,
      wherein applying the source representations comprises:
         applying, to a first recurrent unit of the trained recurrent neural network model, the source representations sequentially in an order that conforms to the determined sequence of the corresponding activated sources and
         applying, the source representations in an opposite order to a second recurrent unit of the trained recurrent neural network model, the opposite order being opposite of the order; and
   generating, over the trained recurrent neural network model based on applying the input, an output that includes a set of probability measures,
      wherein each of the probability measures of the set is associated with at least one corresponding candidate source of a plurality of candidate sources, and indicates a likelihood that the corresponding candidate source will interact next with the given electronic resource.

10. The method of claim 9, further comprising:

applying, as additional input to the trained recurrent neural network model, a resource representation of the given electronic resource;

wherein generating the set of probability measures over the trained recurrent neural network model is further based on applying the additional input.

11. The method of claim 10, wherein applying the resource representation comprises:

applying the resource representation sequentially in combination with each application of the source representations.

12. The method of claim 9, wherein the recurrent unit is a long short-term memory unit.

* * * * *